Oct. 14, 1924.

R. N. CHAMBERLAIN

STORAGE BATTERY

Filed Dec. 12, 1923

1,511,826

INVENTOR.
Rufus N. Chamberlain
BY
ATTORNEYS.

Patented Oct. 14, 1924.

1,511,826

UNITED STATES PATENT OFFICE.

RUFUS N. CHAMBERLAIN, OF CHICAGO, ILLINOIS, ASSIGNOR TO GOULD STORAGE BATTERY CO., OF NEW YORK, N. Y., A CORPORATION OF NEW YORK.

STORAGE BATTERY.

Application filed December 12, 1923. Serial No. 680,116.

*To all whom it may concern:*

Be it known that I, RUFUS N. CHAMBERLAIN, a citizen of the United States, residing at Chicago, in the county of Cook and State of Illinois, have invented certain new and useful Improvements in Storage Batteries, of which the following is a specification.

My invention relates to storage batteries and particularly to the arrangement of separators and plates so as to secure a maximum efficiency and life of the battery.

Heretofore ribs have been placed upon wood as well as rubber separators, but there has not been any precaution taken to properly arrange the ribs on the separators relative to those on the plates so as to secure maximum life and efficiency from the battery. Considerable increase in life and efficiency is secured by so designing and arranging the plates and separators that the ribs on the separators coincide with the ribs on the storage battery grid.

Figure 1:
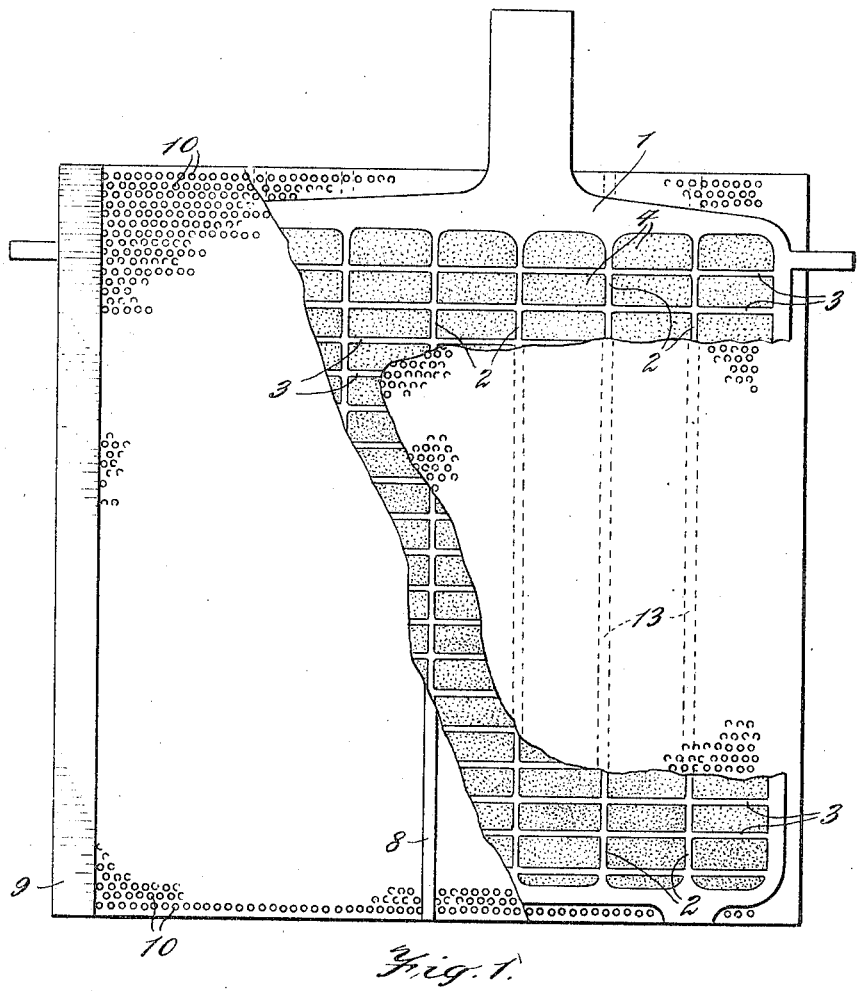
Figure 2:
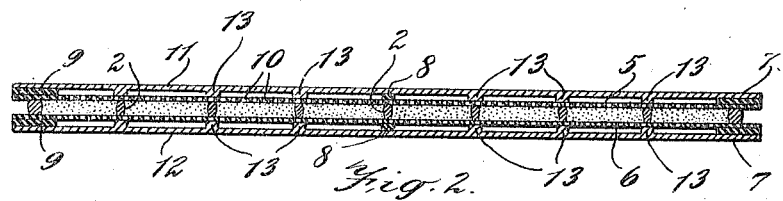

My invention will be better understood by reference to the accompanying drawings in which Fig. 1 is a side elevation, partly in section, of a plate and separator embodying my invention, and Fig. 2 shows a horizontal section of a plate and separator embodying my invention.

Referring to the drawings, the plate comprises a grid 1 with vertical ribs 2 and horizontal ribs 3 between which ribs are placed pellets 4 of active material. This constitutes, what is commonly known as the pasted grid plate. Placed on the outside of the plate are rubber separators 5 and 6 each provided with three ribs 7, 8 and 9 with the ribs turned away from the plate. These separators are perforated throughout their area as shown at 10. Wood separators 11 and 12 each having a plurality of ribs 13 are placed adjacent the rubber separators 5 and 6 with the ribs on the wood separators turned toward the rubber separator. The thickness of the ribs on the wood and rubber separators is such that they fit into each other as shown in Fig. 2. The negative plate of the battery is placed against each of the wood separators 11 and 12 and this arrangement is duplicated sufficiently to produce a battery of the desired number of plates.

The ribs on the rubber separators, it will be noted, correspond with the outside and central ribs of the plate grid and the ribs on the wood separators correspond with the other ribs on the plate grid.

By this construction there are no ribs in contact with the active material of the plates and, therefore, there is no increased internal resistance in the battery due to the displacement of the electrolyte by the ribs, and interference with the direct passage of the current between the active materials of the opposite plates. The absence of ribs on the active material permits of a substantially larger immediate discharge from the battery. This is particularly desirable for batteries used with the starting outfits for automobiles and other similar purposes. It is well-known that the discharge rate of a battery depends upon its internal resistance and I have discovered that this internal resistance is substantially decreased by so devising and arranging separators as to avoid the presence of any ribs across the active material of the plate. Furthermore, the mechanical strength of the battery unit is increased by placing the ribs of the separators coincident with the vertical ribs of the plate. This additional mechanical strength comes about by reason of the fact that the pressure areas of the separator which are created by the ribs are against the smooth solid surface of the grid ribs and this surface remains unchanged during the continued operation of the battery, whereas in batteries as heretofore constructed the pressure areas of the separator bear alternately against the narrow horizontal ribs of the grid and the intervening soft surfaces of the active material. Upon changes due to charge and discharge the wood separators deteriorate, consequently, the life of the battery was substantially shortened and its efficiency impaired.

In those constructions of batteries where the ordinary wood separator is used instead of the duplex separator, as shown in the drawings, the ribs on the wood separator are placed against the ribs on the positive plate grids and the smooth surface of the wood separators against the negative plates. In such constructions wide ribs are provided on the wood separators corresponding to the ribs on the rubber separators, as shown in the drawings, and the intermediate ribs on the separators are of substantially the size shown in the drawings. In no case are any ribs placed on the active material of the positive plates and as a result the increase in efficiency and mechanical strength above pointed out are secured.

My invention has many advantages resulting from the arrangement and coordination of parts as above explained.

Many changes may be made in the details of the parts without departing from the spirit of my invention.

I claim:

1. The combination with positive and negative storage battery plates having ribs thereon of duplex separators comprising a wood member and a hard rubber member each having ribs thereon and placed with the ribbed sides together, said ribs on the separators being so placed as to coincide with the ribs on the plates and leaving free the space between the ribs on the plates.

2. The combination with positive and negative storage battery plates having vertical ribs thereon of duplex separators between said plates and comprising an acid resistant member provided with wide vertical ribs at its edges and a narrower rib near its center and a wood member having ribs between the ribs on the acid resistant member all of said ribs being so placed as to coincide with the ribs on the plates and leaving the space free between the ribs on the plates.

RUFUS N. CHAMBERLAIN.